United States Patent Office 3,202,466
Patented Aug. 24, 1965

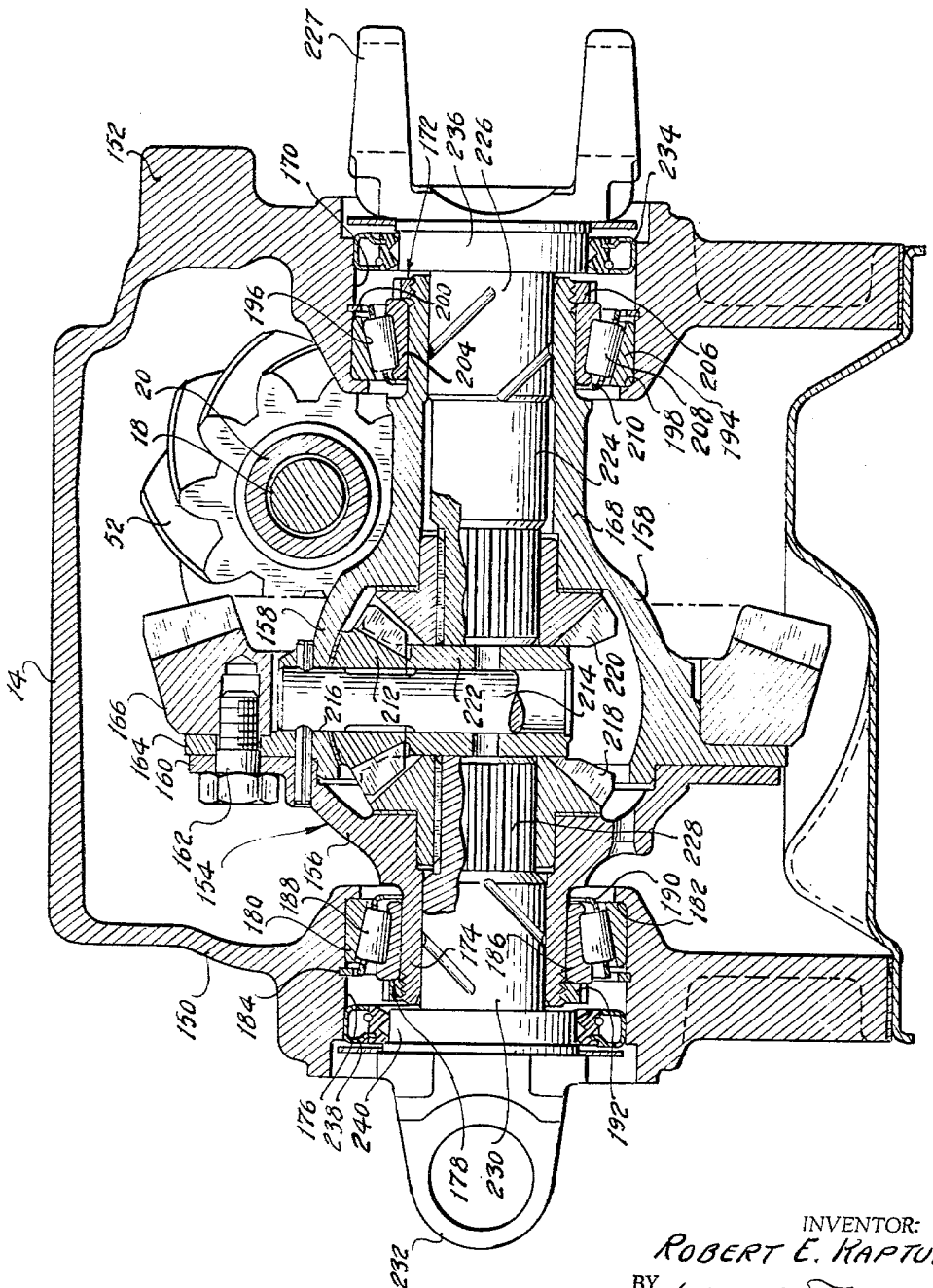

3,202,466
MOUNTING ARRANGEMENT WITH SELF-COMPENSATING ROLLER BEARINGS
Robert Eugene Kaptur, Birmingham, Mich., assignor to Ford Motor Company, Dearborn, Mich., a corporation of Delaware
Filed Sept. 9, 1963, Ser. No. 307,619
2 Claims. (Cl. 308—207)

My invention relates generally to improvements in bearing arrangements for torque delivery gears and pinions, and more particularly to a bearing arrangement for rotatably mounting torque delivery elements such as driving pinions and torque transmitting gears of a power transmission mechanism.

Although my improved bearing arrangement can be adapted for a variety of uses, I have disclosed a preferred form of my invention in a hypoid differential gear and carrier assembly that is rotatably supported by tapered roller bearings. In such an arrangement, it is conventional design practice to mount rotatably a driving pinion in meshing engagement with a ring gear of a differential carrier. The carrier in turn supports differential pinions. The differential pinions engage juxtaposed differential side gears that in turn are drivably connected to axle shafts through a suitable universal joint mechanism.

The driving pinion may be supported on a power output shaft that in turn is journalled within a transmission housing by means of tapered roller bearings. A power output shaft is supported by the bearings at spaced locations and the outer race of one bearing engages a shoulder formed in the stationary transmission housing. The inner race of that same bearing engages the power output pinion. The thrust of the pinion is transferred directly to the inner race of the other bearing through the power output shaft. The outer race of the other bearing can be adjustably mounted within a bearing adaptor, the latter being threaded within a threaded opening in the transmission housing. As the adaptor is rotated, the bearings are each preloaded with an axial load to provide a substantially zero tolerance running fit.

The outer races of the bearings are supported within their respective bearing openings by means of an interference fit.

During operation of the transmission mechanism, the temperature of the lubricant within the housing increases the temperature of the housing itself, thereby causing it to expand. This relaxes the interference fit of the outer bearing races and upsets the desired running clearance of the bearing. This problem is aggravated further by reason of the axial expansion of the housing since the outer races of the bearings will tend to follow the deflection of the housing and assume a slightly greater span during operation at high temperatures than the corresponding span that would exist when the transmission mechanism is cold.

It is an object of my invention to overcome this problem by providing a bearing arrangement that will provide the desired running clearance for the bearing regardless of variations in the temperature of the housing within which the bearings are supported.

It is another object of my invention to provide a pre-loaded bearing structure which will maintain constant preloads regardless of variations in the temperature of the housing.

I contemplate that my improved bearing arrangement can be used successfully in a power transmission mechanism having an aluminum housing. The coefficient of thermal expansion for aluminum alloys that may be used for this purpose is approximately 12.4. This is in contrast to a corresponding coefficient of thermal expansion for steel which is about 6.0. The use of an aluminum alloy housing in an environment of this type thus can be made feasible without the necessity of providing complex and costly automatic bearing load adjusting devices and without the necessity for constantly servicing the mechanism to provide proper running clearance for the bearings to satisfy varying operating condition.

For the purpose of describing my invention more particularly, reference will be made to the accompanying drawing, which is a cross-sectional view of a differential gear assembly embodying my improved mounting arrangement.

In FIGURE 1, the aluminum housing portion 14 includes two transverse walls 150 and 152. Rotatably supported between the walls 150 and 152 is a steel differential carrier 154. This includes two carrier housing parts 156 and 158. Part 156 is formed with a flanged periphery 160 which is bolted by means of bolts 162 to a mating flanged periphery 164 of the part 158. The bolts 162 also secure a differential ring gear 166 to the carrier 154. Gear 166 engages a differential drive pinion 52 which is connected to transmission power output shaft 20. A power input shaft 18 for the transmission, not shown, is concentrically received within shaft 20.

Part 158 includes a sleeve shaft extension 168 that is rotatably supported within a bearing opening 170 formed in wall 152. This support is provided by a tapered roller bearing assembly generally identified by reference character 172. In a similar fashion, housing part 156 is formed with a sleeve shaft extension 174 which is journalled within a bearing opening 176 formed in the wall 150. A tapered roller bearing assembly 178 is situated within the opening 176 for supporting extension 174. It includes an outer race 180 that is held within the opening 176 with an interference fit. It engages a shoulder 182 formed on the wall 150. A snap ring 184 holds the race 180 axially fast against the shoulder 182.

An inner race 186 surrounds extension 174. Tapered roller bearing elements 188 are situated within the races 186 and 180 and are caged for rotation in unison by the cage element 190 in the form of an annular metal part having openings within which the elements 188 are received.

The end of extension 174 is threaded to receive an adjusting nut 192 which engages the race 186 when the nut 192 is tightened. Bearing assembly 178 is preloaded with the reaction for the axial force applied by the nut 192 being taken upon the shoulder 182.

Bearing assembly 172 includes an outer race 194 which is received within a bearing opening 196 formed in wall 152. An interference fit between the race 194 and the opening 196 is provided. Race 194 is held axially fast against a reaction shoulder 198 and a snap-ring 200 prevents axial movement in a right-hand direction.

Bearing assembly 172 includes also an inner race 204 which receives the end of extension 168. This end is threaded to receive an adjusting nut 206 which engages the race 204. Tapered roller bearing elements 208 are disposed between the races 194 and 204. These rollers are assembled within a bearing cage 210 which is in the form of a ring having openings that receive the individual rollers. A pair of differential pinions 212 are journalled upon a pinion shaft 214, although only one pinion 212 is shown in FIGURE 1. Shaft 214 in turn is received within aligned openings 216 formed in the carrier housing part 158.

Pinions 212 engage differential side gears 218 and 220. A suitable spacer bushing 222 positions the side gears within the differential carrier housing. Gear 220 is internally splined to a first power output shaft 224 which is journalled within the extension 168, a suitable bearing portion 226 being provided for this purpose. A yoke 227 can be carried by the shaft 224 to provide a connection with a universal joint which in turn can be connected through a suitable driveline to one of the vehicle traction wheels.

In a similar fashion, gear 218 is splined to a second power output shaft 228. This shaft is formed with a bearing portion 230 so that the extension 174 can rotate relative to it.

Shaft 228 includes a yoke 232 which forms a part of a universal joint connection with a second driveline associated with a second traction wheel.

A fluid seal 234 can be positioned within the opening 196 for the bearing assembly 172. It engages an annular shoulder 236 formed on the shaft 224. In a similar fashion, a seal 238 is received within bearing opening 176 for the bearing assembly 178. It engages a shoulder 240 formed on the shaft 228.

The power output pinion 52 engages bevel teeth of the ring gear 166. As pinion 52 is rotated in the manner described previously, ring gear 166 is rotated about the axis of shafts 224 and 228. As the ring gear and the carrier 154 rotate, the pinions 212 cause gears 218 and 220 to rotate, while accommodating in a conventional fashion a differential motion of shaft 224 with respect to shaft 228.

As explained previously, the housing portion 14 tends to expand upon an increase in the operating temperature. I contemplate that the carrier housing, the power output shafts and the differential gearing will be formed of steel, whereas the housing itself will be formed of aluminum alloy. Under these conditions the housing will expand to a higher degree than the other components of the mechanism by reason of its higher coefficient of thermal expansion. The preload applied to the bearing assemblies 172 and 178 will be maintained constant, however, since an increase in the transverse dimensions of the bearing openings will be accompanied also by a slight increase in the span between the outer races 180 and 194 of the bearing assemblies. This characteristic is due to the geometries and strategic dispositions of the bearing assemblies 172 and 178. The roller elements 208 and 188 are tapered with their smaller diameter ends on the inboard sides of the bearing assemblies. Also, the central axes for the rollers are each located in the plane of a cone having an apex on the inboard sides of the bearing openings.

The outer race may be press fitted directly into the aluminum bore so that when a maximum design operating temperature is reached, some interference still will exist between the race and the housing. This growth in the outer race diameter, however, does not result in a reduction in the bearing preload since the housing can be designed so that the outer race will be shifted axially to a sufficient degree to avoid relaxation of the preload. No actual sliding of the bearing races with respect to the housing occurs, of course.

Having thus described a preferred embodiment of my invention, what I claim and desire to secure by U.S. Letters Patent is:

1. A bearing arrangement rotatably journalling a rotary structure within a housing, said housing being formed of a material having a coefficient of thermal expansion that expansion that exceeds the corresponding coefficient for said rotary structure, a pair of aligned bearing openings formed in said housing, a roller bearing assembly received within each opening for journalling said rotary structure at spaced locations, each bearing assembly comprising a tapered outer race and a tapered inner race with tapered roller bearing elements disposed therebetween, the smaller diameter ends of said rollers being located on the inboard side of their respective bearing assemblies, the axes of rotation of said bearing elements lying in the plane of a cone having an apex situated on the inboard side of the bearing opening for the assembly, a shoulder formed in said bearing opening, said outer race engaging said shoulder, said rotary structure having shaft portions extending through said inner races, each shaft portion being threaded, and a nut threaded on each threaded shaft portion engageable with its associated inner race whereby an independent preload is applied to each inner race, said preload acting toward the inboard side of said bearing assembly.

2. A bearing arrangement rotatably journalling a rotary structure within a housing, said housing being formed of a material having a coefficient of thermal expansion that exceeds the corresponding coefficient for said rotary structure, a pair of aligned bearing openings formed in said housing, a roller bearing assembly received within each opening for journalling said rotary structure at spaced locations, each bearing assembly comprising a tapered outer race and a tapered inner race with tapered roller bearing elements disposed therebetween, the smaller diameter ends of said rollers being located on the inboard side of their respective bearing assemblies, the axes of rotation of said bearing elements lying in the plane of a cone having an apex situated on the inboard side of the bearing opening for the assembly, a shoulder formed in said bearing opening, said outer race engaging said shoulder, said rotary structure having shaft portions extending through said inner races, each shaft portion being threaded, and a nut threaded on each threaded portion engageable with its associated inner race whereby an independent preload is applied to each inner race, said preload acting toward the inboard side of said bearing assembly, said outer race and its cooperating bearing opening being provided with an interference fit, said interference fit being relaxed as the temperature of said housing increases, the running clearance of said bearing elements being maintained relatively constant as said outer races are shifted away from each other upon an increase in the temperature of said housing.

References Cited by the Examiner

UNITED STATES PATENTS

| 2,047,186 | 7/36 | Bates | 308—178 |
| 2,324,676 | 7/43 | Butterfield | 308—236 X |
| 2,550,908 | 5/51 | Bryant | 308—178 |
| 2,894,790 | 7/59 | Rudnicki | 308—207 |
| 3,001,842 | 9/61 | Body | 308—236 |
| 3,071,421 | 1/63 | Jones | 308—178 |

DON A. WAITE, *Primary Examiner.*

ROBERT C. RIORDON, *Examiner.*